United States Patent [19]

Tompkins

[11] 3,838,598
[45] Oct. 1, 1974

[54] CAPILLARY FLOW METER
[75] Inventor: Eugene E. Tompkins, Lexington, Mass.
[73] Assignee: Brunswick Corporation, Skokie, Ill.
[22] Filed: Mar. 19, 1970
[21] Appl. No.: 21,170

Related U.S. Application Data
[63] Continuation-in-part of Ser. No. 811,424, March 28, 1969, abandoned.

[52] U.S. Cl. ................................. 73/205 L, 73/211
[51] Int. Cl. .............................................. G01f 1/00
[58] Field of Search ........................... 73/211, 205 L

[56] References Cited
UNITED STATES PATENTS

| 2,163,730 | 6/1939 | Goetzl | 73/211 X |
| 2,212,186 | 8/1940 | Ricardo et al. | 73/205 L |
| 3,071,001 | 1/1963 | Goldsmith | 73/211 |
| 3,250,469 | 5/1966 | Colston | 73/205 L |
| 3,330,156 | 7/1967 | Thomas | 73/205 L |
| 3,487,688 | 1/1970 | Magliozzi | 73/211 |

Primary Examiner—Jerry W. Myracle

[57] ABSTRACT

This disclosure describes a new type of flow meter. A housing defines a passage wherein fluid flows through a plurality of capillaries. The flow in these capillaries is laminar even if the fluid in the passage upstream of the capillaries is in turbulent flow. There are pressure taps across the meter wherein the pressure drop thereacross is linear with respect to the flow through the meter.

14 Claims, 27 Drawing Figures

INVENTOR
Eugene E. Tompkins
BY John G. Hemmes
ATTORNEY

INVENTOR
Eugene E. Tompkins
BY John Heimovics
ATTORNEY

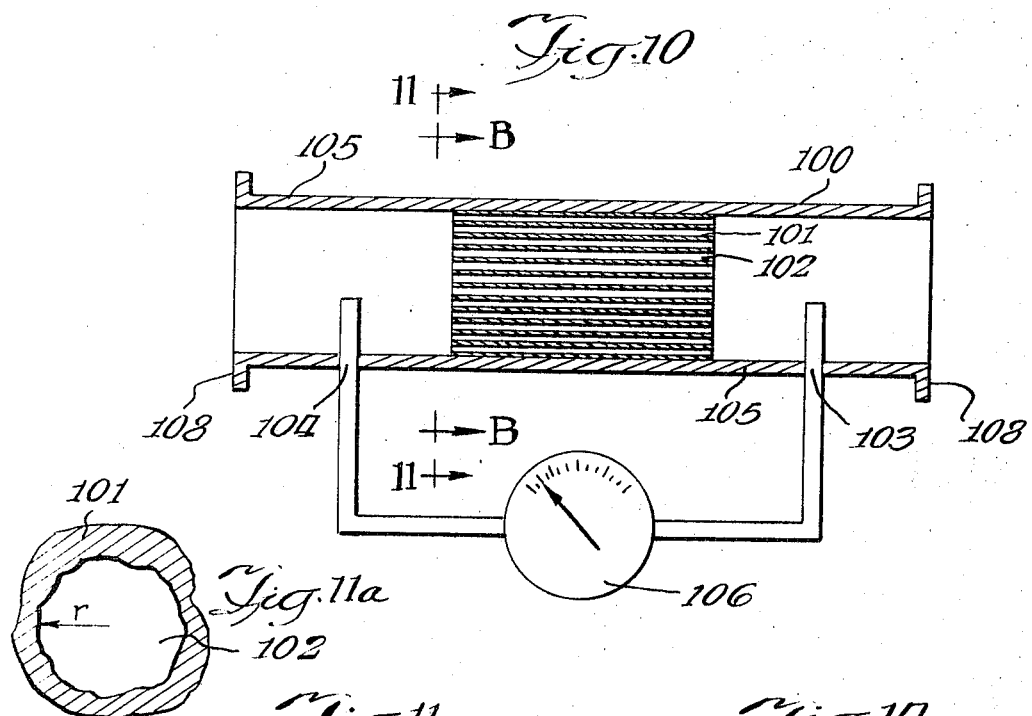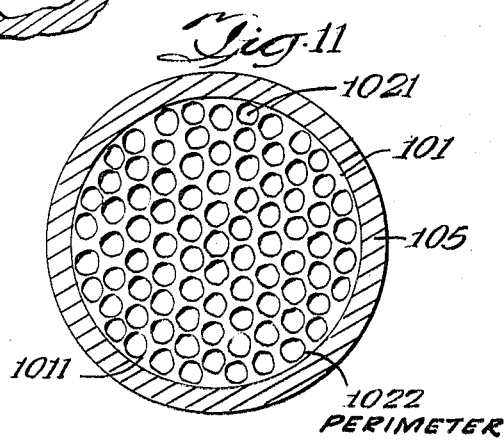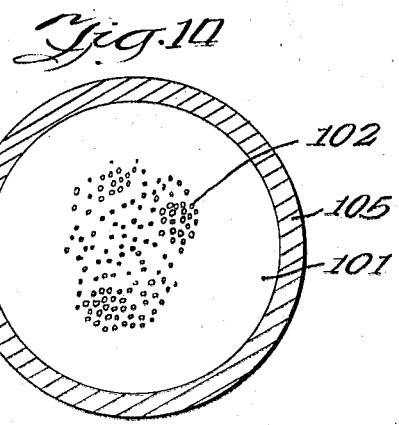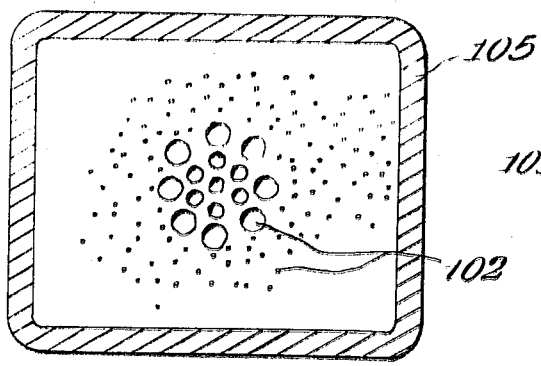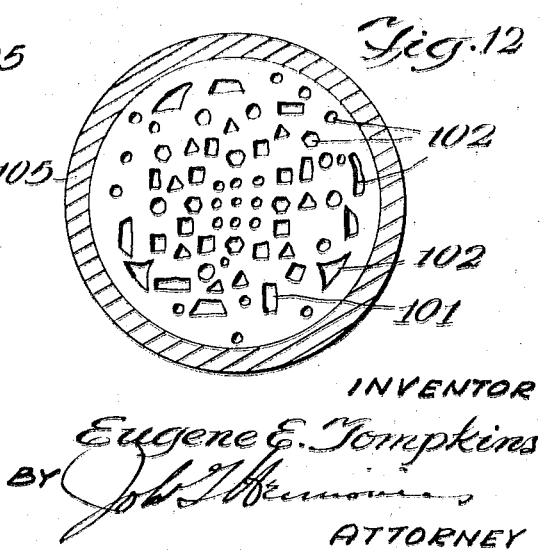

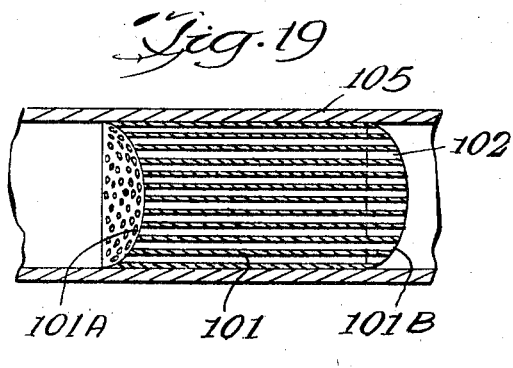
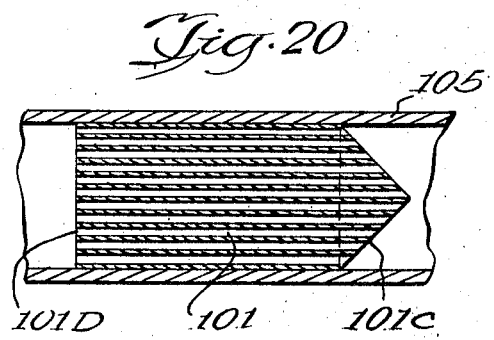
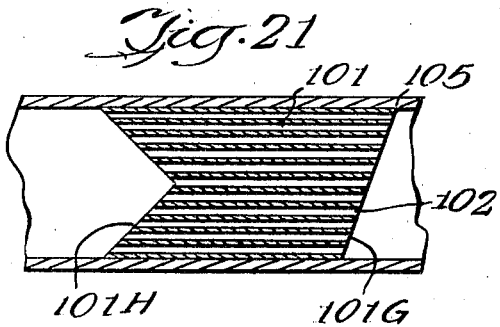
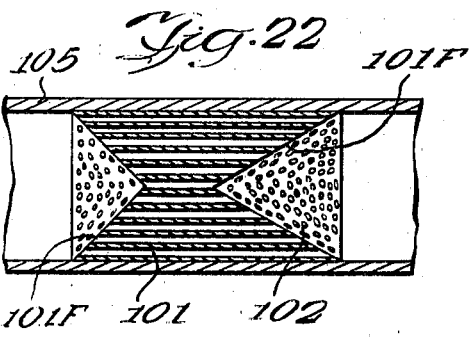
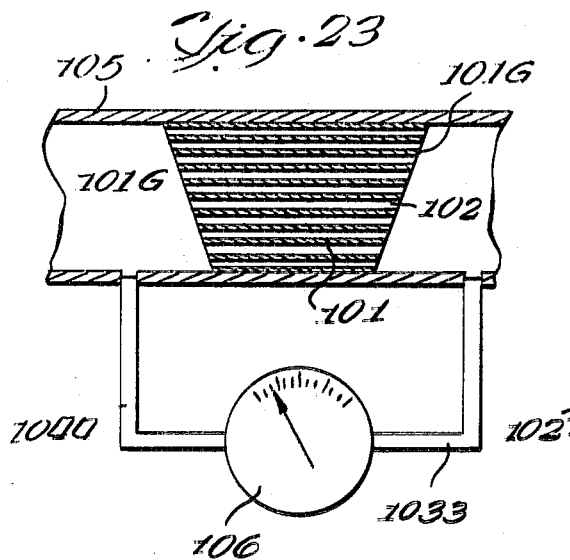
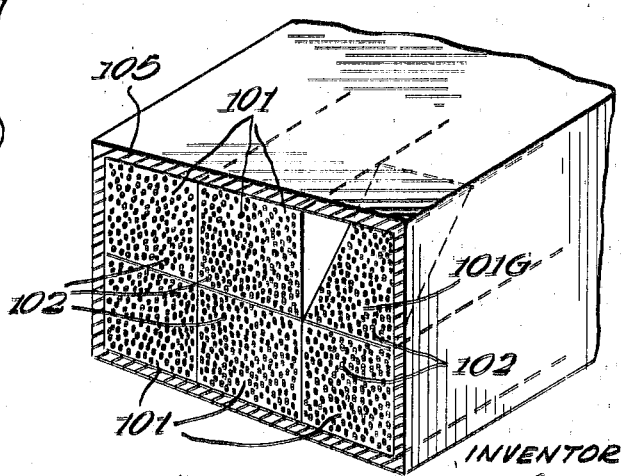

CAPILLARY FLOW METER

CROSS REFERENCE TO CO-PENDING APPLICATION

This application is a continuation-in-part application of my co-pending United States Patent application Ser. No. 811,424, now abandoned filed Mar. 28, 1969.

BACKGROUND OF THE INVENTION

1. Field of the Invention

This invention is in the field of flow meters and, more particularly, is a flow meter capable of measuring the flow of fluids using laminar flow conditions.

2. Description of the Prior Art

For many centuries man has been attempting to measure the quantity of flow of a fluid as well as the flow rate of the fluid. The measurement of a quantity of fluid is easily accomplished by the use of a graduated container for liquids or a known quantity volume container for gas. However, the method of measurement of the rate of flow of a fluid is much more sophisticated and complex. The control of the flow rates of fluids has become increasingly important in today's technology, when, for example, a chemical resin manufacturer is making linear polyester resin plus by-products in a tank. The constituents are added to the mixing tank from pipes with flow meters thereon. The ratio of the constituents must be maintained so that phthalic anhydride, glycerol and acetic acid are added exactly one mole at a time. Consequently, the flow rates can be respectively 148 pounds per hour, 62 pounds per hour and 60 pounds per hour. Any variation in the flow rate of one constituent would immediately necessitate a change of flow rates of the other constituents. Therefore, an accurate flow metering system is needed. The above example illustrates the necessity of accurately measuring and controlling the flow rates of fluids.

Poiseuille in 1840 established experimentally that for laminar flow the following condition was valid for a long cylindrical tube;

$$Q = \pi \Delta P \, r^4 / 8 \, \mu L$$

(Equation 1)

where $Q$ is the volume flowing per unit time, $\mu$ is the fluid viscosity, $\Delta P$ is the pressure difference, $L$ is the length of the tube and $r$ is the radius of the tube. The condition applied for in the derivation of the formula and the experimental confirmation thereof was limiting the flow to laminar flow. However, the boundries of laminar flow was not established until 1883 when O. Reynolds published his findings with respect to laminar and turbulent flow of a fluid. Reynolds deduced from his experiments that at low velocities, the fluid particles moved in parallel layers, or laminae, sliding over particles in adjacent laminae, but not mixing therewith; this then is defined as the regime of "laminar flow." It was found that laminar flow broke down into turbulent flow (where the particles of the fluid laminae start to intermix) at some critical velocity above that at which turbulent flow was restored to laminar condition; the former (or higher) velocity being called upper critical and the latter (or lesser) velocity being called the lower critical velocity. Reynolds was able to generalize his conclusions and introduced a dimensionless term, $R_e$, which was called the Reynolds Number, and defined by $$R_e = 2rV\rho/\mu$$

(Equation 2)

in which $V$ is the average velocity in a pipe, $r$ the radius of the pipe, and $\rho$ and $\mu$ the density and viscosity of the fluid flowing therein. Reynolds found that certain critical values of the Reynolds Number, $R_{ec}$, defined the upper and lower critical velocities for all fluids flowing in all sizes of pipes. Thus, he deduced that a single number defined the limits of laminar and turbulent pipe flow for all fluids.

The upper limit of laminar flow was found by Reynolds to correspond to a Reynolds Number $R_e$, of 12,000 to 14,000, but unfortunately this upper critical Reynolds Number is indefinite, being dependent upon several incidental conditions such as: (1) the initial vibrational energy level of the fluid, (2) shape of pipe entrance, and (3) roughness of pipe. However, these high values of the upper critical Reynolds Number are primarily of academic interest so that for practical use the upper limit of laminar flow may be defined as having a Reynolds Number, $R_{ec}$, equal to 2700 to 4000.

The lower limit of turbulent flow, defined by the lower critical Reynolds Number, is by far the most important; it defines a condition below which all turbulence entering the flow from any source will eventually be dampened out. This lower critical Reynolds Number thus sets a limit below which laminar flow is always supposed to occur. Many experiments have indicated the lower critical Reynolds Number to have a value of about 2000. However, it can easily be expected that when all fluids, both liquids and gases, are considered over a wide range of temperatures and pressures it is best to use the Reynolds Number of 2000 only as a guide.

The basic requirement of a flow meter is to indicate the volume of a fluid passing through an enclosure within a certain time. The velocity of the fluid through the meter may be defined as $$V = Q/A$$

(Equation 3)

where $V$ is the velocity of the fluid, $Q$ the rate of flow (or the volume of flow per a unit of time), and $A$ the area of the enclosure the fluid is flowing therethrough.

By substituting the value for $V$ found in Equation (3) into Equation (2) the Reynolds Number can be determined and the condition of the flow, either laminar or turbulent, can be established when the flow rate and the area are known. It has been found that it is highly desirable to meter the flow of fluids while the flow is laminar because turbulence introduces factors such as non-linear frictional effects, variable viscosities, three dimensional velocity vectors, etc., which complicate metering.

In order to fully appreciate the invention to be hereinafter disclosed, a review of the prior art will provide a background which will be more readily understood by reference to the accompanying prior art drawings wherein:

FIG. 1 is a diagramatic sectional view of a Venturi tube;

FIG. 2 is a diagramatic sectional view of a Venturi meter;

FIG. 3 is a graph showing the non-linear relation between the pressure drop and coefficient of velocity for the Venturi meter of FIG. 2;

FIG. 4 is a diagramatic sectional view of a "long radius" nozzle meter;

FIG. 5 is a graph of the relationship between the coefficient of velocity and the pressure drop across the nozzle of FIG. 4;

FIG. 6 is a diagramatic sectional view of a "short radius" nozzle;

FIG. 7 is a graph of the relationship of the coefficient of velocity and the ratio of the areas of the openings of the nozzle of FIG. 6;

FIG. 8 is a diagramatic sectional view of an orifice; and

FIG. 9 is a graph of the relationship of the coefficient of correction and the ratio of the area of the pipe and the orifice opening.

An early fluid metering device was named after the Italian Physicist G. B. Venturi. A Venturi tube, referring to FIG. 1, is a convergent-divergent tube. By use of the familiar Bernoulli principle, it is evident that the pressure difference $p_o - p_2$ created by flow through the tube is a measure of the velocity wherein $$P_o + \tfrac{1}{2}\rho V_o{}^2 = P_2 + \tfrac{1}{2}\rho V_2{}^2$$

(Equation 4)

in which $p_o$ is the pressure at 0, $V_o$ the velocity of the fluid at 0, $\rho$ the density of the fluid, $p_2$ the pressure of the fluid at 2, and $V_2$ the velocity of the fluid at 2. If an incompressible fluid is assumed then $$V_o A_o = V_2 A_2$$

(Equation 5)

in which $A_o$ is the area at 0 and $A_2$ is the area at 2, and by substituting Equation 5 in Equation 4 the following relationship exists:

$$P_o - P_2 = \tfrac{1}{2}\rho V_o{}^2((A_o{}^2/A_2{}^2) - 1)$$  (Equation 6)

However, $A_o$ is unknown but it is dependent upon both the area $A_1$ which is located in the converging part of the tube as well as the shape of the tube. A Venturi meter is illustrated in FIG. 2 wherein the entrance pipe 1 is provided with a pressure gage 5 as well as pressure tap 6, a converging section having a cone angle of about 20°, a short cylindrical portion 2 having a diameter ¼ to ½ of the pipe diameter with pressure gage 8 and a pressure tap 7 thereon, the pressure taps 6 and 7 connected to a manometer 9 indicate the pressure drop within the meter, and a diffusor cone 3 having a diverging angle of about 5 degrees to 7 degrees. In order for the Venturi meter to function properly, long sections of pipe, free of fittings and straightening vanes, are placed upstream of the Venturi meter so that flow rate fluctuations are reduced to a minimum or eliminated. The differential manometer 9 measures the pressure difference between the base 0 and the throat 2. The equation for the flow of a fluid through a Venturi meter is $$Q = A_2 / \sqrt{1-(A_2/A_1)^2} \; \sqrt{2g(P_1-P_2/w)}$$  (Equation 7)

in which the new terms are Q the flow rate, $w$ the specific weight and $g$ the acceleration due to gravity. Unfortunately there are always frictional resistance losses and energy losses in a Venturi meter between sections 0 and 2 and therefore, Equation 6 must always be corrected by an experimental coefficient, $C_r$, the "coefficient of velocity" in order to make the meter's readings conform to reality.

Equation 7 therefore becomes $$Q = C_r A_2 / \sqrt{1-(A_2/A_1)^2} \; \sqrt{2g(P_1-P_2/w)}$$  (Equation 8)

It is necessary to emperically calculate the values of $C_r$ for each Venturi meter. By its very nature, a Venturi meter is very expensive to fabricate and the cost of obtaining a more accurate Venturi increases at a faster rate than the increased accuracy justifies. Also, the pressure tap locations are extremely critical. Because the throat of the Venturi must be from ¼ to ½ the diameter of the entering pipe the effective range of any one Venturi meter is consequently limited. FIG. 3 indicates a non-linear relationship between the pressure drop and the "coefficient of velocity."

Flow nozzles are another type of fluid measuring device that has been used for many years; however, it was only in the late 1930's that extensive research was conducted on "flow nozzles" in order to obtain sufficient data thereon to insure reliability in the design thereof. Flow nozzles are illustrated in FIGS. 4 and 6. These nozzles are designed to be clamped between the flanges of a pipe, generally having rather abrupt curvatures of the converging surfaces, terminate in short cylindrical tips, and are similar to Venturi meters with the diffuser cone omitted. Since the diffusor cone exists primarily to minimize energy losses caused by the meter, larger energy losses will naturally result from flow nozzles rather than Venturi meters. Consequently, Venturi meters will be more efficient although the flow nozzles are much cheaper. The "long radius" flow nozzle in FIG. 4 although cheaper than a Venturi has a number of critical interrelated dimensions in which the location of the piezometer connections are a function of the diameters $d_1$ and $d_2$, etc. The flow rate equation for the nozzle of FIG. 4 is the same as Equation 8, the flow rate for a Venturi. The relation of $C_r$ to $\Delta P$ is shown in FIG. 5 but this emperical coefficient is only valid where $A_2/A_1$ is less than .25 and the value of $V_2 d_2 \rho / \mu$ is not less than $(400{,}000 - 8330/d_2)$.

The "short radius" nozzle of FIG. 6 differs from the "long radius" nozzle in shape and in the location of the piezometer connections, $P_1$ and $P_2$ which are made by holes or slots adjacent to the faces of the nozzle. This method of pressure connection is convenient in that the nozzle, complete with pressure connections, may be built as a unit and installed between the flanges of a pipe line without the necessity of drilling piezometer holes in the pipe. The same equation for the flow rates applies to both flow nozzles although Cv for the "short radius" nozzle as shown in FIG. 7 is not a straight line relationship. The flow nozzles also exhibit undesirable characteristics such as; usually operating in the turbulent flow regime thereby giving inconsistant readings, each meter being able to operate over only a narrow range and the coefficient of velocity must be calibrated for each nozzle because there are complex eddy currents created and fluid density changes.

The third type of classical flow meter is the orifice as shown in FIG. 8. The conventional orifice for use as a metering device in a pipe line consists of a concentric square-edge circular hole in a thin plate which is clamped between the flanged pipe line. The orifice differs from the nozzle as to flow characteristics in that the most constricted section of the flow (called the "vena contracta") cannot occur within the orifice but downstream from it owing to the nonaxial direction of the fluid particles as they approach the orifice. This face seems to complicate the problem since, in the flow equation for an orifice (which is the same as Equation 8), $$Q = Cv\ A_3 / \sqrt{1-(A_2/A_1)^2}\ \sqrt{2g(P_1-P_2/w)}$$

the flow rate is partially dependent upon a value for $A_2$, the vena contracta, which is located somewhere downstream of the orifice making $A_2$ difficult to determine. In order to simplify the situation, another experimental coefficient $C_c$, the "coefficient of contraction" may be advantageously introduced; $C_c$ being defined as $A_2/A$. This is simply the ratio between the unknown area $A_2$ and the known area of the orifice A. By introducing a second factor, C, called the "orifice coefficient" which is defined by $$C = C_c\ C_v / \sqrt{1 - C_c^2(A/A_1)^2}$$

(Equation 9)

When the "coefficient of contraction," $C_c$, and the "orifice coefficient," C, are substituted in Equation 8 the resulting is $$Q = CA\ \sqrt{2g(P_1-P_2/w)}$$

(Equation 10)

It must be noted that the "orifice coefficient," C, as shown in FIG. 9 is not a linear relationship and must be emperically determined. Some of the disadvantages of the orifice meter as a flow meter are (1) the pressure tap must be located exactly at the vena contracta, the position of which varies with the flow rate, (2) the fluid flow rate is not a linear function of any variable, (3) a single orifice cannot be used over too large a range of flow rates, (4) orifices are subject to fouling, (5) the empirical orifice coefficient must be determined for each orifice, and (6) all replacement units must be recalibrated in the line.

Although there are some advantages as well as disadvantages of one meter over another, the orifice, the flow meter and the Venturi meter exhibit two undesirable characteristics wherein each meter is dependent on being calibrated by emperical means and the fluid flow rate is not a linear function of any variable.

SUMMARY OF THE INVENTION

This invention relates to a flow meter and, more particularly, to a laminar flow meter.

When the capillary structure is placed in a housing with upstream and downstream pressure probes connected to a pressure indicating or flow indicating gage, the meter so constructed will accurately indicate the flow, the flow rate or the pressure drop across the meter. This meter is so designed that it operates in the laminar flow regions for all fluids and is therefore a very economical meter (as will be discussed hereinafter). This then constitutes one of the significant advantages of laminar flow meter.

The classical types of flow meters all require that a coefficient of correction be empirically calculated for each meter. A chart of these variable correction factors must accompany the meter to the user so that the correct flow rates may be obtained. It is time consuming for the manufacturer to compute this chart and therefore increases the cost of the meter. Since my flow meter requires no such correction chart, it is much cheaper to manufacture.

The laminar flow meter employs a collimated hole structure to provide the structural passage for the meter. One object of the present invention is the provision of a flow meter that operates in the laminar flow range for fluids.

While the classical types of flow meters have been hereinabove reviewed and it has been pointed out that although there has been wide spread use thereof it is because they were primarily the only types of flow meters available. Accordingly, another object of this invention is the provision of a laminar flow meter wherein the flow rate is a linear function of the pressure drop.

Another object of this invention is the provision for a flow meter that is free of emperical constants.

And another object of this invention is the provision for a capillary structure that is homogeneous and cellular.

Still another object of this invention is the provision for a capillary structure wherein each capillary has an effective radius and the effective radius can be the same or different for adjacent capillaries.

And still another object of this invention is the provision for a capillary structure wherein each capillary has a definite length and the length of adjacent capillaries can be the same or different.

Yet another object of this invention is the provision for a gage that indicates either a pressure drop across the meter or a flow rate through the meter wherein pressure taps are located upstream and downstream from the meter and connected to the gage.

Still another object of this invention is to provide a very accurate flow meter for liquids wherein the Reynolds number is 1000 or less and the pressure taps are positioned within the passage structure at points where fully developed laminar flow exists.

Still yet another object of this invention is the provision wherein the capillaries in the structure can be plugged to alter the flow rate capacity of the meter.

And yet another object of this invention is the provision where the capillary structure comprises a bundle thereof.

And still another object of this invention is the provision for the effective radius of a single capillary to have a radius in the range of .01 microns to 75 mils and the number of capillaries can vary between 2 and $10^6$.

Yet still another object of this invention is the provision for a capillary structure that can change turbulent flow of a fluid, liquid or gas, into laminar flow within the structure.

And another object of this invention is the provision where the web thickness between adjacent capillaries can be equal or different.

And yet another object of this invention is the provision for the end surfaces of said capillary structure to be any pre-selected geometric shape.

The above and other and further objects and features will be more readily understood by reference to the following detailed description and the accompanying drawings.

BRIEF DESCRIPTION OF THE DRAWINGS

FIG. 10 is a sectional view of the laminar flow meter;

FIG. 11 is a section of FIG. 10 along line 11—11;

FIG. 11A is an enlarged view of one capillary passage showing the effective radius r;

FIG. 12 is a sectional view of one embodiment of the capillary structure taken on line B—B of FIG. 10;

FIG. 13 is a sectional view of another embodiment of the capillary structure taken on line B—B of FIG. 10;

FIG. 14 is a sectional view of another embodiment of the capillary structure taken on line B—B of FIG. 10;

FIG. 19 is a transverse sectional view of one embodiment of the meter structure, without the pressure taps, depicting the end surfaces thereof;

FIG. 20 is a transverse sectional view of another embodiment of the meter structure, without the pressure taps, depicting the end surfaces thereof;

FIG. 21 is a transverse sectional view of another embodiment of the meter structure without the pressure taps depicting the end surfaces thereof;

FIG. 22 is a transverse sectional view of another embodiment of the meter structure, without the pressure taps, depicting the end surfaces thereof;

FIG. 23 is a sectional view of another embodiment of the meter; and

FIG. 24 is a pictorial sectional view of another embodiment of the invention wherein capillary structures are bundled together.

DESCRIPTION OF THE PREFERRED EMBODIMENT

Figure 1:
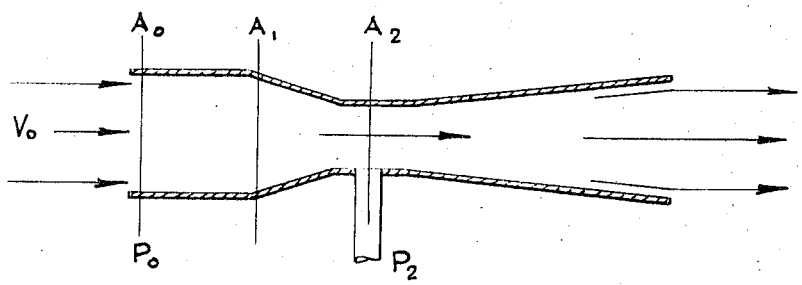
Figure 2:
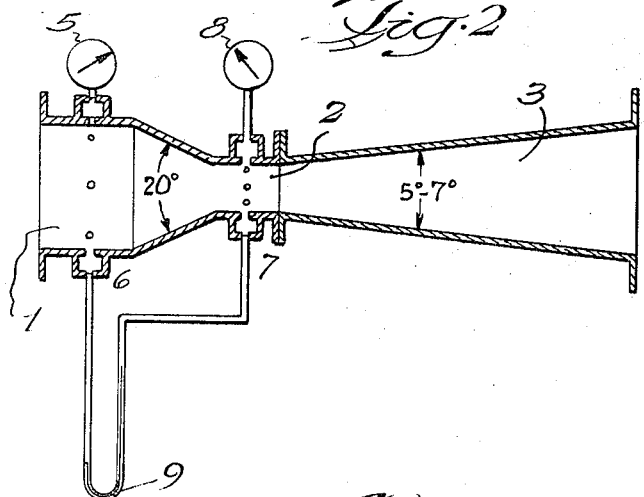
Figure 3:
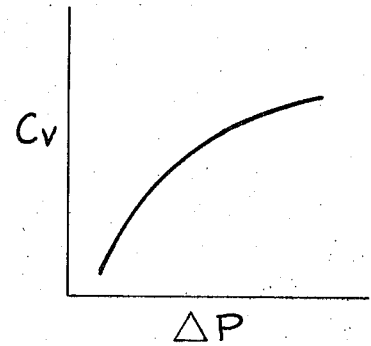
Figure 4:
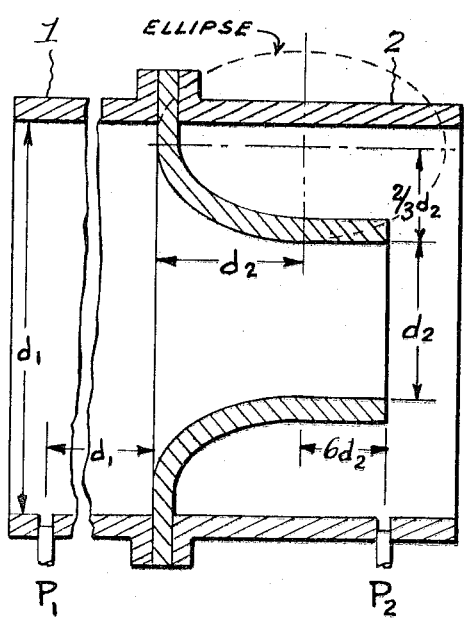
Figure 5:
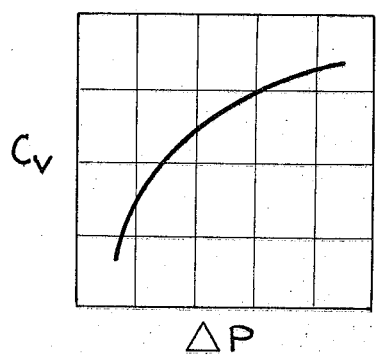
Figure 6:
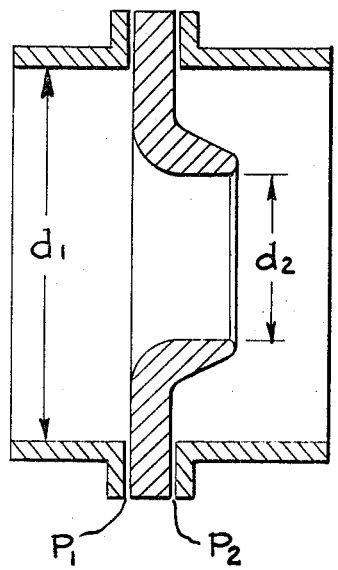
Figure 7:
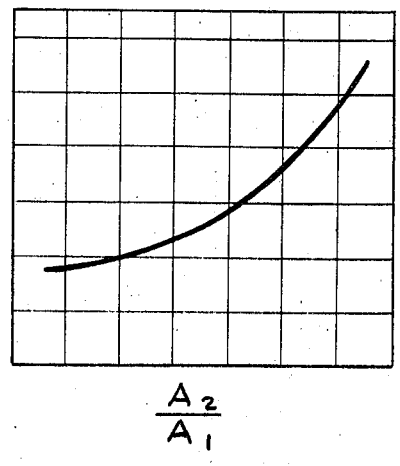
Figure 8:
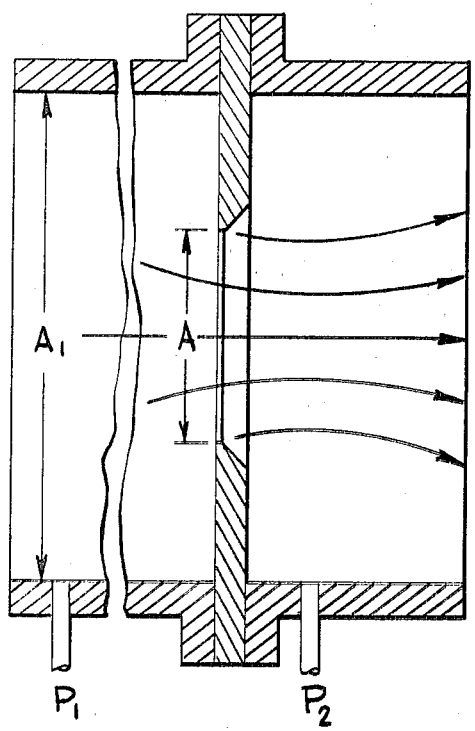
Figure 9:
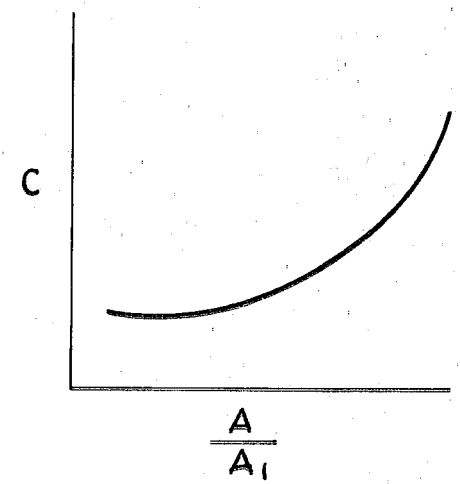
Figure 15:
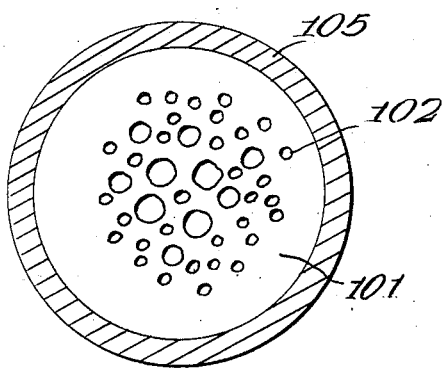
FIG. 15 is a sectional view of another embodiment of the capillary structure taken on line B—B of FIG. 10.
Figure 16:
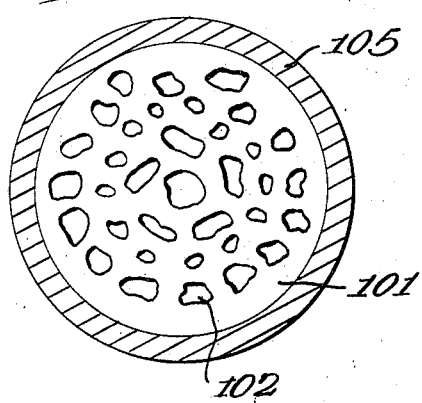
FIG. 16 is a sectional view of another embodiment of the capillary structure taken on line B—B of FIG. 10.

By referring to FIG. 10, the flow meter 100 comprises a housing 105, a structure 101 having a plurality of substantially parallel capillaries 102 therein, a pair of pressure probes 103 and 104 upstream and downstream of the capillary structure 101 and a device 106 which indicates the difference in pressure between the probes 103 and 104. The flanges 108 are one means for adopting the housing 105 to a flow stream. However, any convenient means can be used as desired.

The device 106 can be a simple pressure gage or manometer. However, the device 106 can also be a combination of mechanisms such as an electrical transducer and a differential pressure sensing gage that when operated as one unit can produce linear electrical signals in response to a change in pressure.

In the preferred embodiment of the invention the structure 101 with capillaries 102 is formed by constricting a bundle of tubes with rods inserted therein, removing the rods after constricting and cutting the structure so formed to a pre-selected length. By using pre-selected rod sizes and tubes as well as a pre-selected number of reducing operations such as extruding, wire drawing, swaging, etc., the exact size of the resultant capillaries can be precalculated. One such method of making structures with a large number of fine capillaries is taught by Roberts and Roberts in their U.S. Patent application Ser. No. 778,679 filed Nov. 25, 1968 and now U.S. Pat. No. 3,506,885, and owned by the assignee hereof. The passage structure of the flow meter and the methods of making such a structure, as taught in U.S. Pat. No. 3,506,885, are fully incorporated herein. However, other methods can be used to make the desired structure as long as the passages have the proper dimensions and the length of the structure is suitable. The capillaries 102 in the structure 101 can vary in location and arrangement, with respect to each other; however, the capillaries should be substantially parallel. Various arrangements of the capillaries are shown in section form in FIGS. 11 through 16. As shown, the capillaries 101 can have a substantially perfect geometric shape such as a square, circle, rectangle, triangle, etc. There are many other identifiable geometric shapes such as a pentagon, hexagon, trapezoid, etc., and all are contemplated within the scope of this invention. It is fully contemplated that the cross-section of the capillaries 102 can have any preselected irregular shape as well. In the preferred embodiment as shown in FIG. 11, the capillaries 102 have a substantially circular but irregular cross-section. It should be noted that as shown in FIG. 11a, the slightly reentrant cross section of a typical capillary of the passage structure, defines an irregular capillary cross-section which extends for the length of the passage structure. Accordingly, it is apparent then that each capillary will be characterized by a rough unmachined wall. As mentioned earlier the critical lower and upper limts for laminar flow were in part dependent upon the roughness of the conduit through which the fluid flows, and this is also true of capillaries. It is further well known in fluid flow art that to assure that laminar flow exists at the lower critical limits the Reynolds Number, Re. should have a value of 2,000 or less, preferably around 1,000 or less. However, this restriction severely limits the maximum flow rate obtainable when only one or a few capillaries are used, since the flow rate depends upon the capillary radius to the 4th power. Therefore, it is known that in order to calculate the flow with reasonable accuracy, the radius of a single capillary would have to be known with great accuracy with the capillary dimensional tolerances accordingly being extremely critical. However, by using a large number of parallel capillaries it can, by ordinary statistics, be shown that only a reasonably accurate determination of a nominal capillary radius need be made, with the roughness of the capillary walls becoming less significant as the number of capillaries increases. The present invention being a recognition of this fact thereby eliminates a major problem encountered in the art which knew that the roughness of the capillary walls cause obstructions to and the formation of vortices and turbulence which propogate downstream. Accordingly, an inherent advantage of this invention then is the elimination of the necessity to critically maintain the dimensional tolerances as taught in the prior art. By recognizing the fact that the rough wall problem becomes less insignificant as the number of capillaries is increased, a passage structure having a great number of rough walled capillaries eliminates the requirement for smooth walled capillaries as taught in the prior art. The perimeter 1022 of the capillaries 102 can be measured with a planimeter and the cross-sectional area of any capillary computed. When the size of the capillaries are extremely small, the use of photographic enlargements can be used in the calculation of the area thereof. If the computed area of the capillary is assumed to mathematically equal the equation for a perfect circle, $A = \pi r^2$, where $r$ is the radius of the circle, then the radius for a perfect circle can be calculated, which I have defined as the effective radius, $r$, for the capillary 102. For generally circular cross-section capillaries, the effective $r$ relation of $A = \pi r^2$ is valid. However, in other geometric configurations the effective $r$ is a function of the longest dimension of the geometric cross-section.

For laminar flow to occur through a flow meter, certain basic conditions must be met. These conditions are established by the physical properties of the fluid passing through the system, the maximum flow rate of the fluid, and the maximum pressure drop allowable for the fluid in the system. The rate of flow, Q, for an incompressible fluid passing through a capillary can be easily calculated by $$Q = \pi \, \Delta P \, r^4/8\mu L$$

(Equation 11)

wherein $\Delta P$ is the pressure drop across the meter structure, $r$ is the effective radius of the capillary's cross-section, $\mu$ is the viscosity of the fluid passing through the meter and L the length of the capillary wherein Equation 11 is really Poiseuille's equation (Equation 1).

By transposing Equation 11

$$r^4 = 8\mu \, QL/\pi \, \Delta P$$

(Equation 12)

the radius of the capillary is therefore a function of and related to the length L. The viscosity $\mu$ for a given fluid is known and the flow rate, Q, and the pressure drop $\Delta P$, are established parameters for the meter. However, in order to provide laminar flow through the structure 101 of the meter, a maximum Reynolds Number that will insure laminar flow in the system must not be exceeded for the capillary. As previously mentioned, Equation 2 for the Reynolds Number is $$R_e = 2r \, V\rho/\mu$$

(Equation 2)

rearranging:

$$r = R_e \, \mu/2\rho V$$

(Equation 2a)

to insure laminar flow, the Reynolds Number must be below the maximum Reynolds Number producing laminar flow ($R_{mlf}$).

Substituting $R_{mlf}$ for $R_e$ $$r = R_{mlf} \, \mu/2\rho V$$

(Equation 13)

Since $V = Q/A$ (Equation 3) and, for essentially round capillaries:

$$V = Q/\pi r^2$$

(Equation 14)

therefore, substituting for V in Equation 13 yields $$r = 2Q\rho/R_{mlf}\pi\mu$$

(Equation 15)

Thus, to assure laminar flow:

$$r \geq 2Q\rho/R_{mlf}\pi\mu$$

(Inequality 1)

Thus, Inequality 1 gives a means of insuring that laminar flow can be achieved in the laminar flow element embodied in the device.

Furthermore, it has been necessary to require that $$L/2r \geq 5 \text{ or } L \geq 10r$$

(Inequality 2)

where $r$ is the capillary diameter and L is the capillary length. By using the minimum value for inequality 2

$$L = 10r$$

(Equation 16)

Thus, using Equation 16 to insert a value of L in terms of $r$ in Equation 12, the following is obtained:

$$r^3 = 80\mu Q/\pi\Delta P$$

(Equation 17)

wherein $r$ is a function of the fluid characteristics, the pressure drop, and the flow rate. Using the $r$ calculated from Equation 17 and Equation 16, the required L can easily be obtained. It should be noted, however, that the $r$ — vs.—L relationship calculated hereinabove by using equation 16 represents the minimum ratio of $L/2r$. Values of $L/2r$ up to and in excess of 100 can be used where, for instance, a high pressure drop and/or a very low flow rate is needed, since increasing the length of a capillary of a given diameter will increase the resistance to flow. Once $r$ has been obtained by either of the above methods, Inequality 1 is used to insure that the flow will, indeed, be laminar.

It is understood by those skilled in the art that since there are a plurality of capillaries in the meter the value of the total flow, $Q_t$, is the sum of all the Q's for each individual capillary.

Figure 25:
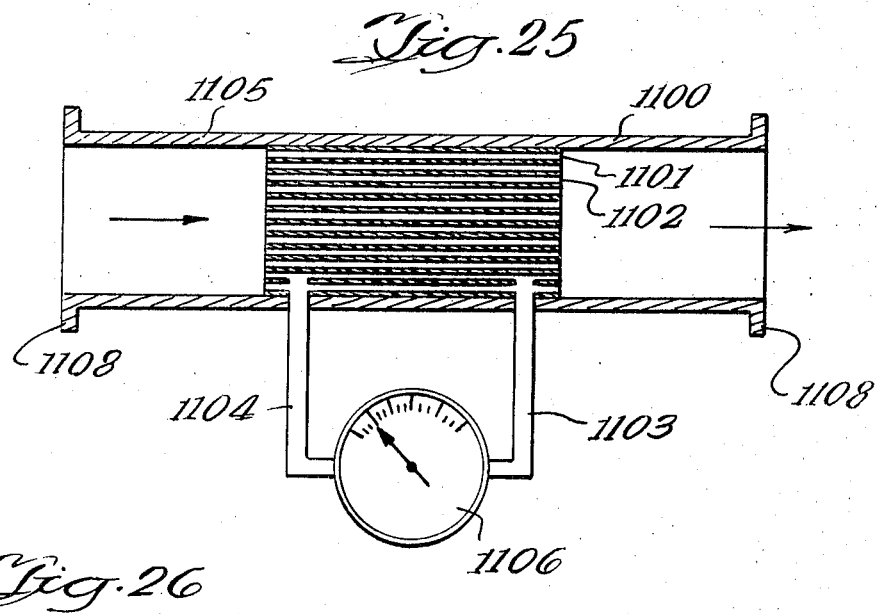
FIG. 25 is a diagrammatic sectional view of another embodiment of the invention.

In order to insure the linear relationship for liquids under high pressure or when very accurate linear flow meters are desired, it has been found that the preferred embodiment as shown in FIG. 25 provides the greater accuracy desired. The flow meter 1100 comprises a housing 1105, a passage structure 1101 having a plurality of substantially parallel capillaries 1102 therein, a pair of pressure probes 1103 and 1104 passing through the housing 1105 into the passage structure 1101. A device 1106 connected between the probes 1103 and 1104 indicate the pressure drop therebetween. The housing 1105 has end flanges 1108 for coupling the flow meter 1101 into any desired system. In making very accurate flow meters it is necessary to construct the passage structure in such a manner that the fluid flow in each capillary 1102 becomes completely laminar. Additionally, it has been found necessary to place the upstream probe 1104 at a location within the flow meter such that fully developed laminar flow exists upstream of the probe 1104. The location of the down stream probe 1103 although not as critical must also be such that immediately upstream of the probe fully developed laminar flow exists. It has been found that to provide this very accurate laminar flow meter for liquids where the pressure differential (between the pressure probes) is directly proportioned to the Q, the rate of flow, it is necessary to have an $L/2r$ of approximately 80 or more.

In the preferred embodiment, the structure 101 can be provided with capillaries that occupy up to 90 percent of the space within the fluid conduit. Thus, the structure 101 can provide a highly porous path which will offer little resistance to the flow and cause only a small pressure drop thereacross. The porosity can also be decreased from the 90 percent maximum down to any desired level to provide the proper operating characteristics of the meter. One method of decreasing the porosity is to plug some of the capillaries.

This type of flow meter is not dependent on any emperical correction factors such as the $C_r$, or C as are the classical flow meters discussed hereinbefore. Consequently, the pressure drop across the probes is directly proportional in a linear relationship to the flow rate. Thus it is possible to calibrate a pressure meter to read directly in flow rate such as gallons per minute, fluid ounces per second, etc., instead of pressure measurements as pounds per square inch, inches of water, etc.

Figure 17:
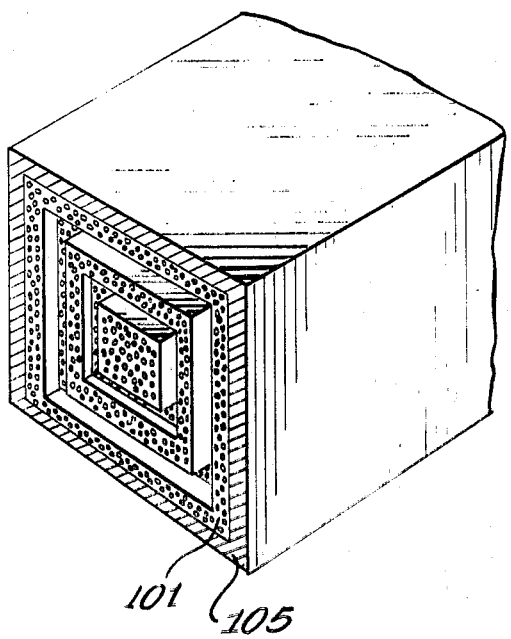
FIG. 17 is a pictorial sectional view of an alternally stacked embodiment of the capillary structure.
Figure 18:
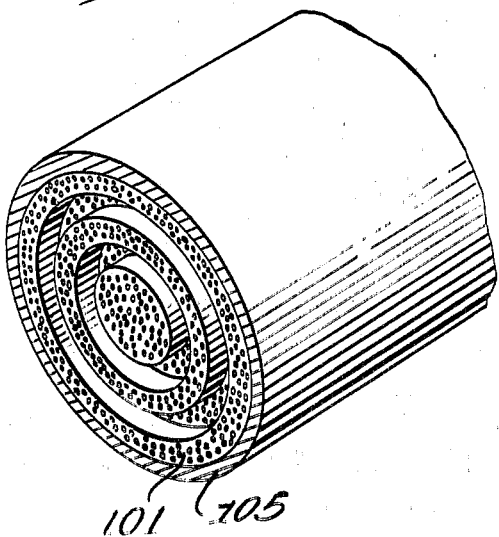
FIG. 18 is a pictorial sectional view of a coaxial embodiment of the capillary structure.

As discussed above, the values for r and L are the minimum values that insure laminar flow. Thus, it is only necessary that the minimum relationship between L and r from equation 16 be maintained. It is therefore possible to vary the effective radius or the length for any capillary provided the basic requirements for laminar flow are maintained. It is fully contemplated that adjacent capillaries in the same structure can have different lengths and radii. Some of the possible geometric configurations are shown in FIGS. 18 through 22. In FIGS. 17 and 18, which is a sectional view of the capillary structure 101 the structure can either be laminate layers of bundled capillaries wherein one layer is a different length from the other layer, or the layers as illustrated can be concentric circles, squares, or any similar figure wherein all the layers are coaxial. In FIG. 19 the end surfaces of the capillary structure are shown as concave 101A and convex 101B. One end surface 101C of the structure 101 is shown as a cone in FIG. 20. In FIG. 21, one end surface 101H of the capillary structure 101 is a wedge slice section while the other end surface 101G is transverse surface. Both end surfaces in FIG. 22 are inverted conical surfaces 101F. Many other geometric configurations are contemplated within the scope of the invention and obvious to those skilled in the art.

In addition, because different fluids, both liquids and gases, have a wide variety of physical properties, it is fully contemplated that within one flow meter structure the capillaries can have different geometric cross-sections such as circles, hexagons, irregular shapes, etc., and in any combination thereof. These cross-sectional combination arrays can have different effective radii and lengths for each capillary but when combined together the laminar flow characteristics must be achieved for each capillary.

The housing of the meter can be of any convenient shape such as a generally circular shape shown in FIG. 12. However, the internal and external cross-section of the housing is only predicated by the fluid conduit's shape. It is equally contemplated that the capillary structure 101 can be bundled together in groups as shown in FIG. 24 wherein six generally square cross-sectional capillary structures 101 are shown together making up one composite capillary structure. The upstream and downstream locations of the pressure probes are not critical. Additionally, the types of pressure probes are also not critical. As shown in FIG. 10 the probes 103 and 104 can be of a simple single hole capillary tube type. In fact, as illustrated in FIG. 23, the pressure taps can be tubes 1033 and 1044 that are tightly secured to holes in the meter housing 105. This type of meter eliminates the need of accurately placing the downstream pressure probe or tap at the vena contracta as required by other flow meters.

My capillary flow structure causes a fluid to move therein in laminar flow. This means that the molecules of the fluid march in even rows down the capillary tubes. The molecules in rows pass evenly by each other. Since the capillary structure is so designed to insure laminar flow passing therethrough, it has been found that by placing this structure in a conduit where there is turbulent fluid flow entering the structure that the fluid will exit the capillary structure in laminar flow. Thus such a capillary structure can be placed in a conduit with turbulent flow therein, and the structure can be used as a laminating flow device causing the exiting fluid from the capillary structure to be in laminar flow. As a consequence thereof, the capillary flow meter can convert turbulent flow entering the meter to laminar flow and thereby measure fluid in laminar flow through the meter while the fluid on the inlet side can be in turbulent flow. It is also possible that the exiting fluid will go into a turbulent state after leaving the meter but this does not effect the operation of the meter.

In order to better understand the simplicity of this device, the following examples are given for specific flow condition requirements.

EXAMPLE I

A requirement for a meter to measure water flowing through a ½ inch diameter pipe wherein the water is at 70° F., the maximum flow rate is 600 cubic feet per hour (cfh) and the maximum pressure drop across the meter is 20 psi can be provided by my invention. From the very nature of the parameters of the required meter, the following values are known:

density $\rho = 1$ gm/cm$^3$
viscosity $\mu = 1$ centipoise
Q = 600 cfh; and
Q = 1/6 cf/sec; and
Q = 288 in$^3$/sec; and also
Q = 4710 cm$^3$/sec
$\Delta P$ = 20 psi In order to use Q as in$^3$/sec equation 11 has a correction factor to permit the above units to be used. Therefore, equation 11 is now:

$$Q = (2.71)(10^6)\Delta P \ r^4/L\mu$$

(Equation 18)

Since $L/2r$ is at least 5 then $L = 10r$ and equation 11 becomes $$Q = (2.71)(10^5)\Delta P \, r^3/\mu$$

(Equation 19)

Therefore equation 17 is changed to $$r^3 = Q\mu/(2.71)(10^5)\Delta P$$

(Equation 20)

If we now assume that we have 5000 capillaries in our meter then we can solve the equation 20 and 11 for $r$ and $L$. Since the flow through one capillary will be 1/5000 of the total $Q$ flow then:

$Q_c = 2.88/5000 = .0576$ in$^3$/sec
$r^3 = .0576/(2.71)(10^5)(20)$
$r = .0022$ inch or 2.2 mils
and $L = .022$ inch or 22 mils long.

In order to ascertain if laminar flow is present, the Reynolds Number equation is used where $Q_c$ must be in cm$^3$/sec and $r$ in cm$^3$. Therefore $r = .0022$ in $\times$ 2.54 cm/in $= .0056$ cms.
$Q_c = 4710/5000 = .942$ cm$^3$/sec.
$R_e = 2\rho Q/\mu\pi r = (1)(.942)(2)/(1)\pi(.0056)$ $R_e = 106.4$  (Equation 15)

The Reynolds Number value of 106.4 is well within laminar flow conditions. If the radius of a capillary is .0022 inch then the area of 5000 capillaries with this $r$ will be about .106 in. square which is far less than the area of the pipe—.196 square in. In other words, the area of the capillary passages is only 54 percent of the area of the pipe and the solid area for the structure is 46 percent. As indicated hereinabove the porosity of the capillary structure can be as high as 90 percent.

If 1000 capillaries for the same problem is assumed then the radius for the capillaries will be .00375 inch or 3.75 mils. The Reynolds Number for the capillaries was found to be 311 and well within the region of laminar flow.

If 100 capillaries for the same problem is assumed then the radius for the capillaries is .0081 inch or 8.1 mils and the length is .081 inch or 81 mils. The Reynolds Number for each capillary is 1440 and well within the region of laminar flow.

If, however, the Reynolds Number for the maximum flow rate in the pipe is calculated by using Equation 15, $R_e = 2\rho Q/\pi r\mu = (2)(1)(4710)/(1)\pi(.25)(2.54)$
$R_e = 4620$ Thus the water flowing in the pipe has entered the transition between laminar and turbulent flow ($R_e$ between 3000 at 10,000) but when the same water flows through the meter it is in laminar flow. It can therefore be appreciated that the flow meter structure also has the ability to change turbulent flow into laminar flow.

Additionally, as the examples point out, the use of a structure having anywhere from 100 capillaries to at least 5000 capillaries can provide the laminar flow needed for the meter. From an economic standpoint this enable a manufacturer and supplier of meters made in accordance with this invention to stock relatively few capillary structures (as certain number of passages i.e. 100, 500, 1000, 2500, 5000, etc.) in long lengths, and thus provide a meter for most applications simply by cutting the passage structure to the desired length. This economic feature is indicated from the above calculations.

EXAMPLE II

A flow meter was made using a 1 inch inside diameter liquid flow conduit, with a 1 inch outside diameter passage structure mounted therein; the structure having a length of approximately .875 inches. The passage structure had approximately 14,400 substantially parallel passages therein and a porosity of approximately 50 percent with each passage having an effective diameter of approximately 4.5 mils. An upstream pressure probe was located in the passage structure approximately ⅜ inch rearwardly from the upstream edge of the structure. The downstream pressure probe was located approximately ⅜ inch from the upstream probe and also placed into the passage structure. A linear pressure gage was connected to the ends of the pressure probes. The meter was connected in a system where the time of flow, weight of flow in pounds, pressure drop across each passage, and the flow rate in gallons per minute were measured for a variety of flow rates. The fluid used was water having a temperature of approximately 77° F.

Figure 26:
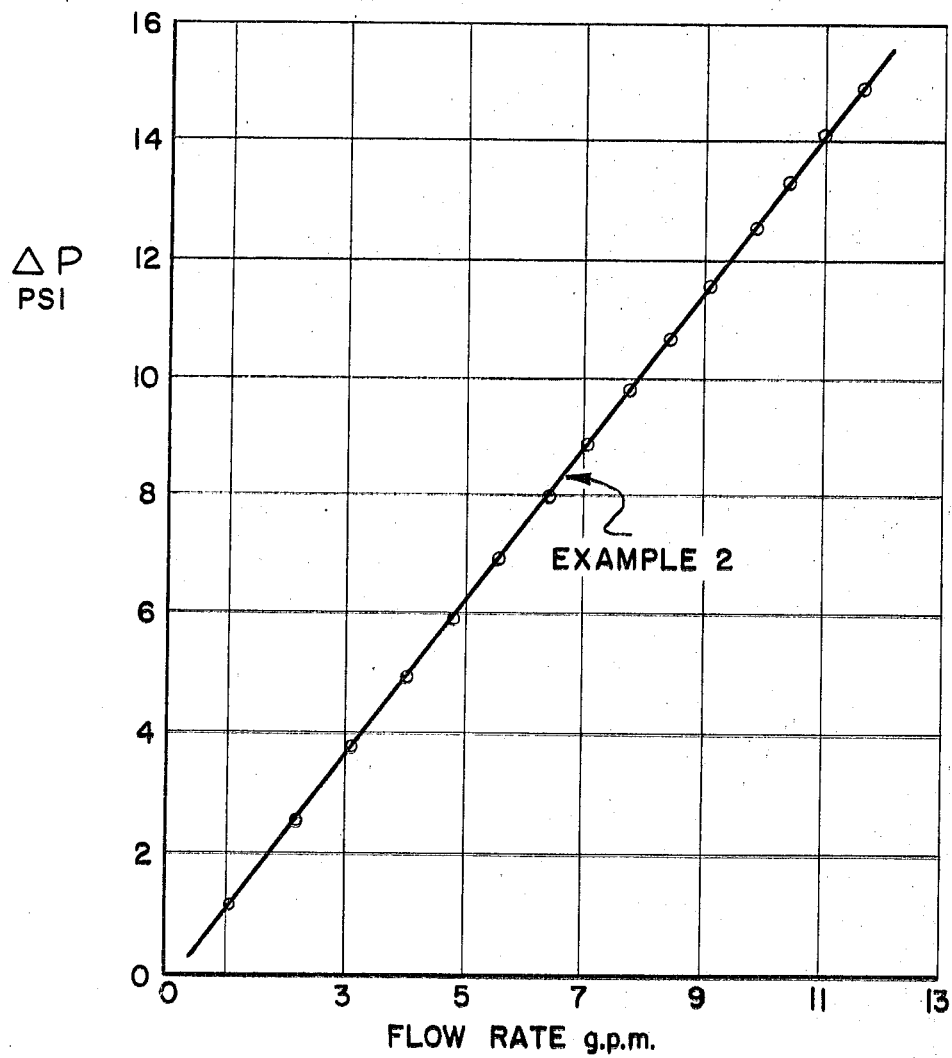
FIG. 26 is a graph showing the relationship between pressure drop and the flow rate of a flow meter made similarly to the flow meter shown in FIG. 25.

The flow rate, Q, in gallons per minute was plotted verses pressure drop in psi across the passage structure and the resulting curve shown in FIG. 26. This graph shows the straight line relationship between flow rate and the pressure drop pointing out the linearity of the flow meter.

Since the calculations for this flow meter are equal to the empirical testing thereof, it has been found that it is possible to compute the flow meter's flow rate, Q, verses the pressure drop without the empirical testing required for the other meters, and, thereby provide a pre-design laminar flow meter.

Because of the wide latitude of the radius and length that structures can be used for a meter, it is fully contemplated that capillaries with different radii and lengths can be combined into one structure and still function as a meter. Since there is no correction factor for the meter such as a $C_r$, etc., combinations of different radius-length arrangements will not alter the simplicity of designing a laminar flow meter.

It has been found that the preferred structure range for my invention is where the number of capillaries is from 2 to $10^6$ and the effective radius of the capillaries is from .01 microns to 75 mils. As shown in FIG. 11A the effective radius is equal to a radius for a perfect circle having the same area as the slightly reentrant cross section of the capillary 102. It is fully contemplated as described hereinabove that there can be combinations of cross-section areas or different radii in any one structure as long as there is laminar flow therethrough.

Although specific embodiments of the invention have been described herein, modifications and changes may be made therein without departing from the scope of the invention as defined in the appended claims.

I claim:

1. A flow meter for measuring the rate of flow of a fluid, the fluid having a density $\rho$ and a viscosity $\mu$, the fluid moving through the meter at a flow rate Q, the meter having a Reynolds Number for maximum laminar flow not greater than $R_{mlf}$ and $\Delta P$ the pressure drop of the fluid across the meter, the meter comprising:

a housing;

a metal structure located within said housing and having a plurality of substantially parallel capillaries therethrough, each of the capillaries having rough unmachined reentrant interior wall surfaces, the structure and the capillaries both having a length L and each capillary having an effective radius $r$, the $r$ being greater than $2Q\rho/R_{mlf}\mu\pi$ and ranging in size from 0.01 microns to 75 mils and the ratio of $L/2r$ being greater than 5;

means located within said housing and being responsive to the flow of the fluid; and means within the structure capable of converting turbulent to laminar flow so that there is a first order straight line relationship between $\Delta P$ and Q.

2. The meter of claim 1 wherein said structure is a homogenous cellular structure.

3. The meter of claim 1 wherein said capillaries in the same structure have different radii.

4. The meter of claim 1 wherein said capillaries in the same structure have substantially the same radii.

5. The meter of claim 1 wherein said capillaries of the same structure have different lengths.

6. The meter of claim 1 wherein said means comprise pressure probes located upstream and downstream of the structure.

7. The meter of claim 1 wherein said means is a gage indicating the pressure drop across the structure.

8. The meter of claim 7 wherein the pressure gage directly reflects the flow rate.

9. The meter of claim 1 wherein said responsive means measures the flow rate and converts the flow rate measurement to an electrical signal by a transducer.

10. The meter of claim 1 wherein said meter is calibrated free of empirical constants.

11. The meter of claim 1 wherein said structure has different web thicknesses between capillaries.

12. The meter of claim 1 wherein some of the capillaries are selectively plugged.

13. The meter of claim 1 wherein the ends of said structure have pre-selected geometric shapes.

14. A flow meter for measuring the rate of flow of a liquid, comprising:

a housing;

a metal structure located within said housing having a plurality of substantially parallel capillaries therethrough, each of said capillaries having rough unmachined reentrant interior wall surfaces, the structure and the capillaries both having an effective radius $r$ and a length L, the radius $r$ ranging from 0.01 microns to 75 mils and the ratio of $L/2r$ being greater than approximately 80;

means located within said structure responsive to the flow rate of the fluid; and means within the structure capable of converting turbulent to laminar flow so that there is a first order straight line relationship between the pressure drop across the responsive means and the flow rate through the structure.

* * * * *